United States Patent
Goerl et al.

[11] Patent Number: 5,705,137
[45] Date of Patent: Jan. 6, 1998

[54] PRECIPITATED SILICAS, A PROCESS FOR THEIR PREPARATION AND THEIR USE IN VULCANIZABLE RUBBER MIXTURES

[75] Inventors: Udo Goerl, Bornheim; Andrea Hunsche, Frechen; Robert Kuhlmann, Erftstadt; Mustafa Siray; Heinz Esch, both of Bonn, all of Germany

[73] Assignee: Degussa Aktiengesellschaft, Frankfurt am Main, Germany

[21] Appl. No.: 655,035

[22] Filed: May 29, 1996

[30] Foreign Application Priority Data

Jun. 1, 1995 [DE] Germany .................. 195 20 126.4
Apr. 27, 1996 [DE] Germany .................. 196 17 039.7

[51] Int. Cl.$^6$ .................................................. C01B 33/12
[52] U.S. Cl. ........................... 423/335; 423/339; 106/492
[58] Field of Search ............................. 423/335, 339; 106/492

[56] References Cited

U.S. PATENT DOCUMENTS

| | | | |
|---|---|---|---|
| 3,977,893 | 8/1976 | Wason | 106/288 B |
| 4,251,281 | 2/1981 | Machurat et al. | 106/228 B |
| 4,590,052 | 5/1986 | Chevallier et al. | 423/335 |
| 4,704,425 | 11/1987 | Lagarde et al. | 524/492 |
| 5,009,874 | 4/1991 | Parmentier et al. | 423/335 |
| 5,227,425 | 7/1993 | Rauline | 524/493 |
| 5,342,598 | 8/1994 | Persello | 423/339 |
| 5,403,570 | 4/1995 | Chevallier et al. | 423/339 |
| 5,484,581 | 1/1996 | Esch et al. | 423/335 |
| 5,547,502 | 8/1996 | Chevallier et al. | 106/287.1 |

FOREIGN PATENT DOCUMENTS

| | | |
|---|---|---|
| 1183672 | 3/1985 | Canada .................. 423/335 |
| 0078909 A2 | 5/1983 | European Pat. Off. |
| 0157703 A1 | 10/1985 | European Pat. Off. |
| 0442143 A1 | 8/1991 | European Pat. Off. |
| 0501227 A1 | 9/1992 | European Pat. Off. |
| 0647591 A1 | 4/1995 | European Pat. Off. |
| 1299617 | 7/1969 | Germany . |
| 2628975 | 12/1977 | Germany .................. 423/335 |
| 3144299 | 5/1983 | Germany . |
| 284211 | 11/1990 | Germany .................. 106/492 |
| 4004781 | 8/1991 | Germany . |
| 4427137 | 4/1995 | Germany . |

OTHER PUBLICATIONS

Kieselsaeurestruktur und deren Einfluss auf das gummitechnische Wertebild, Jun. 29, 1994, pp. 47–50, Mittwoch, Section A, Goerel et al.
Sears, Jr. "Determination of Specific Surface Area of Colloidal Silica by Titration with Sodium Hydroxide" Anal. Chem. vol. 28, No. 12, pp. 1981–1983. (Dec. 1956).

*Primary Examiner*—Gary P. Straub
*Assistant Examiner*—Timothy C. Vanoy
*Attorney, Agent, or Firm*—Beveridge, DeGrandi, Weilacher & Young, L.L.P.

[57] ABSTRACT

Precipitated silicas, characterized in that they have a CTAB surface area (in accordance with ASTM D 3765-92) of 200 to 400 m$^2$/g, a DBP index (in accordance with ASTM D 2414) between 230 and 380 ml/100 g as powder and 180–250 g/100 g as granulate, a silanol group density ($V_2$-NaOH consumption) of 20 to 30 ml and the following macropore size distribution which is typical of the surface area range involved, determined by means of Hg porosimetry (DIN 66 133) for specific pore size intervals (incremental mode of application):

| Pore size interval [nm] | CTAB surface area range: 200–250 m$^2$/g | CTAB surface area range: 250–300 m$^2$/g | CTAB surface area range: 300–400 m$^2$/g |
|---|---|---|---|
| | Hg consumption in ml/g of silica | | |
| 10–20 | 0.27–0.49 | 0.35–0.50 | 0.32–0.42 |
| 20–30 | 0.22–0.32 | 0.15–0.30 | 0.17–0.22 |
| 30–40 | 0.15–0.21 | 0.12–0.17 | 0.12–0.15 |
| 40–50 | 0.11–0.16 | 0.09–0.12 | 0.08–0.11 |
| 50–60 | 0.08–0.12 | 0.06–0.10 | 0.06–0.09 |

7 Claims, No Drawings

PRECIPITATED SILICAS, A PROCESS FOR THEIR PREPARATION AND THEIR USE IN VULCANIZABLE RUBBER MIXTURES

INTRODUCTION AND BACKGROUND

The present invention relates to precipitated silicas used as reinforcing fillers in vulcanizable rubber mixtures. Another aspect of the invention resides in the process for preparing certain precipitated silicas. A still further aspect of the invention resides in rubber formulations containing the precipitated silicas.

Precipitated silicas, in general, are known as is their use in tire formulations as shown by the following references.

S. Wolff, E. H. Tan: Performance of Silicas with Different Surface Areas in NR. Paper presented on the occasion of the ACS Meeting, New York City, N.Y., April 1986; and, S. Wolff, R. Panenka, E. H. Tan: Reduction of Heat Generation Truck Tyre Tread and Subtread Compounds. Paper presented on the occasion of the International Conference on Rubber, Jamshedpur (India), November 1986.

An essential parameter for characterizing a precipitated silica is the surface area, which is determined either by the adsorption of nitrogen (ISO 5794/1, Annexe D) or, of greater relevance to rubber engineering, by the adsorption of CTAB in accordance with ASTM D 3765-92. With reference to the rubber engineering data obtained, precipitated silicas are classified in six surface area classes in accordance with ISO 5794/1.

When applied to tires, however, almost exclusively precipitated silicas with CTAB surface areas between 100 and 200 $m^2/g$ are used. See U.S. Pat. No. 5,227,425 and S. Wolff: The Influence of Fillers on Rolling Resistance, presented at the 129th meeting of the Rubber Division of the American Chemical Society, New York, N.Y., Apr. 8–11, 1986.

The reason for this is that precipitated silicas for use in tires must have high strength values and, especially in the region of the tread surface, must have good abrasion resistance. This can only be ensured by using precipitated silicas with surface areas in the range mentioned above. At present, precipitated silicas with CTAB surface areas >200 $m^2/g$, on the other hand, are hardly ever used. However, it is precisely these precipitated silicas which should be characterized by a particularly high abrasion resistance and thus are of particular interest for practical application in tires. The essential reason why they are not used is due to the fact that precipitated silicas with increasing surface areas are extremely difficult to distribute (disperse) in a rubber mixture. This low capacity for being dispersed means that these products do not provide the general properties expected of them and thus offer no advantages, and sometimes even offer disadvantages, as compared with the precipitated silicas currently used in tires.

The reason for this poor dispersion of high surface area precipitated silicas is based on another important property of precipitated silicas, and that property is their structure (measured by means of DBP absorption in accordance with ASTM D 2414). Particularly important, however, is the distribution of macropore sizes (measured using Hg porosimetry in accordance with DIN 66 133) and how it changes with surface area; see the paper by U. Görl, R. Rausch, H. Esch and R. Kuhlmann entitled: Kieselsäurestruktur und ihr Einfluß auf das gummitechnische Wertebild, presented on the occasion of the German Rubber Conference in Stuttgart, June 1994.

In other words, the spread of macropore sizes generally decreases with increasing surface area, if it is not possible to produce additional large pores by means of appropriate precipitation techniques during the production of precipitated silica with the same surface area.

In particular, precipitated silicas with CTAB surface areas >220 $m^2/g$ require special precipitation techniques in order for them to have sufficiently large macropores, and thus good dispersion behavior, despite the large surface area.

It is known that precipitated silicas with the following physico-chemical parameters can be used in rubber mixtures (DE-A 44 27 137):

| | |
|---|---|
| BET surface area | 35 to 350 $m^2/g$ |
| Ratio of BET/CTAB surface areas | 0.8 to 1.1 |
| Pore volume PV | 1.6 to 3.4 ml/g |
| Silanol group density ($V_2$ = NaOH consumption) | 6 to 20 ml |
| Average size of aggregate | 250 to 1500 nm |
| CTAB surface area | 30 to 350 $m^2/g$ |
| DBP index | 150 to 300 ml/100 g |
| $V_2/V_1$ by Hg porosimetry | 0.19 to 0.46 |
| preferably | 0.20 to 0.23 |
| DBP/CTAB | 1.2 to 2.4 |

An object of the invention therefore is to obtain precipitated silicas with CTAB surface areas of >200 $m^2/g$ which are characterized by a particularly high distribution of macropore sizes and thus by particularly good dispersion in a rubber mixture.

Another object of the invention is to obtain improved rubber formulations and products.

SUMMARY OF THE INVENTION

In attaining the above and other objects, one feature of the invention is a precipitated silica product which has a CTAB surface area (in accordance with ASTM D 3765-92) of 200 to 400 $m^2/g$, a DBP index (in accordance with ASTM D 2414) between 230 and 380 ml/100 g, a silanol group density ($V_2$-NaOH consumption) of 20 to 30 ml and the following macropore size distribution which is typical of the surface area range involved, determined by means of Hg porosimetry (DIN 66 133) for specific pore size intervals (incremental mode of application):

| Pore size interval [nm] | CTAB surface area range: 200–250 $m^2/g$ | CTAB surface area range: 250–300 $m^2/g$ | CTAB surface area range: 300–400 $m^2/g$ |
|---|---|---|---|
| | Hg consumption in ml/g of silica | | |
| 10–20 | 0.27–0.49 | 0.35–0.50 | 0.32–0.42 |
| 20–30 | 0.22–0.32 | 0.15–0.30 | 0.17–0.22 |
| 30–40 | 0.15–0.21 | 0.12–0.17 | 0.12–0.15 |
| 40–50 | 0.11–0.16 | 0.09–0.12 | 0.08–0.11 |
| 50–60 | 0.08–0.12 | 0.06–0.10 | 0.06–0.09 |

The invention also provides a process for producing precipitated silicas having the above defined properties wherein the reaction is carried out in a reaction container of water, heated to 30° to 90° C. preferably 50° to 80° C. the pH of which is adjusted to a pH of 5 to 5.9 by adding small amounts of sulphuric acid, the pH being kept constant at 5 to 5.9 by simultaneous introduction of alkali metal silicate solution and sulphuric acid, with constant shear agitation during the entire precipitating time, precipitation being interrupted for an interval of 30 to 120 minutes to obtain a solids concentration of 40 to 60 g/l. The silica suspension thereby obtained is filtered and washed. The filter cake is subjected to short-term drying, then optionally milled or granulated to produce a finely divided precipitated silica product having the properties set forth above.

Another feature of the invention provides vulcanizable rubber mixtures and use of the silicas according to the invention in vulcanizable rubber mixtures which are characterized in that these rubber mixtures contain 5 to 100 parts, in particular 15 to 60 parts of silicas with respect to 100 parts of rubber.

Silicas according to the invention may be added to the rubber mixture, as a powder or in a low-dust finely divided form; e.g. as granules or microbeads, in the way which is conventional in the rubber industry, in a kneading machine or on rollers. Polymer batches, bales or powders, by means of which the silicas according to the invention are introduced during production of the rubber mixture, may also be used.

A still further feature of the invention resides in precipitated silicas which are characterized in that their surfaces are modified with organosilanes of the formulas I to III

(I)

or

(II)

or

(III)

wherein

B represents —SCN, —SH, —Cl, —NH$_2$ (if q=1) or —S$_x$— (if q=2)

R and R$^1$ represent an alkyl group with 1 to 4 carbon atoms or a phenyl group, wherein all R and R$^1$ groups may be identical or different, n is 0, 1 or 2, alk represents a divalent, straight-chain or branched hydrocarbon group with 1 to 6 carbon atoms, m is 0 or 1, ar represents an arylene group with 6 to 12 carbon atoms, preferably 6 carbon atoms, p is 0 or 1, with the proviso that p and n are not simultaneously 0, x is a number from 2 to 8, alkyl represents a monovalent, straight-chain or branched saturated hydrocarbon group with 1 to 20 carbon atoms, preferably 2 to 8 carbon atoms, alkenyl represents a monovalent, straight-chain or branched unsaturated hydrocarbon group with 2 to 20 carbon atoms, preferably 2 to 8 carbon atoms.

Precipitated silicas modified at the surface with organosilanes may be prepared by treating the precipitated silicas with the organosilanes in mixtures of 0.5 to 50 parts, with respect to 100 parts of precipitated silica.

In a preferred embodiment of the invention, bis (triethoxysilylpropyl)-tetrasulphane or in a solid form, for example mixed with industrial carbon black, may be used as an organosilane.

Addition of one or more silanes to the rubber mixture may be performed on the one hand simultaneously, together with he silicas according to the invention, wherein reaction between precipitated silica and silane takes place during the mixing process at elevated temperature. On the other hand, addition of silanes to the precipitated silica/rubber mixture may be performed in such a way that the precipitated silica is treated with one or more silanes before it is added to the rubber mixture and the premodified silica introduced to the rubber mixture. For example, this can be performed in the same way as in the procedure shown in DE-A 40 04 781.

The invention also provides rubber mixtures and/or vulcanizates which contain precipitated silicas according to the invention, optionally modified with organosilanes. Precipitated silicas according to the invention may thus be used in all types of rubber which can be cross-linked with accelerator/sulphur, but also with a peroxide, as listed in DIN/ISO 1629. The following may be mentioned by way of example: elastomers, natural and synthetic, oil-extended or not, as individual polymers or as a mixture (blend) with other rubbers such as, for example, natural rubber, butadiene rubber, isoprene rubber, butadiene/styrene rubber, in particular SBR, prepared using the solution polymerization process, butadiene/acrylonitrile rubber, butyl rubber, terpolymers of ethylene, propylene and non-conjugated dienes. Furthermore, the following additional rubbers are suitable for using for rubber mixtures with the rubbers mentioned:

carboxyl rubber, epoxide rubber, trans-polypentenamer, halogenated butyl rubber, rubber made from 2-chlorobutadiene, ethylene/vinyl acetate copolymers, ethylene/propylene copolymers, optionally also chemical derivatives of natural rubber and modified natural rubber.

Also disclosed are conventional further constituents such as rubber carbon black, natural fillers, plasticizers, stabilizers, activators, pigments, antioxidants and processing aids, added in conventional amounts.

Precipitated silicas, with and without silane, may be used in all rubber applications such as, for example, tires, conveyer belts, sealants, V-belts, hoses, shoe soles, etc.

DETAILED EMBODIMENTS OF INVENTION

Examples

The following test methods are used in the examples:

| | |
|---|---|
| Roughness factor F$^2$H | ASTM D 2663-89 |
| ML (1 + 4) | DIN 53 523/524 |
| Tensile strength | DIN 53 504 |
| 300% modulus | DIN 53 504 |
| Elongation at break | DIN 53 504 |
| Shore A hardness | DIN 53 505 |
| DIN abrasion | DIN 53 516 |
| MTS data | DIN 53 513 |
| Tear propagation resistance | DIN 53 507 |

The feedstocks used in the application examples are:

| Trade name | Description/company |
|---|---|
| Buna VSL 1954/S 25 | Styrene/butadiene rubber prepared by the solution polymerization process (Bayer AG) |
| Buna CB 11 S | Butadiene rubber (Bayer AG) |
| Protector G 35 | Anti-ozone wax (Fuller) |
| X 50-S | Bis-(triethoxysilylpropyl)-tetrasulphane/N 330 50:50 mixture (Degussa AG) |

The silane group density is determined using the method given in G. Sears, Analytical Chemistry, 12, 1982–83 (1956).

Determining the distribution of macropores sizes by means of Hg porosimetry

| | |
|---|---|
| Method | DIN 66 133 |
| Apparatus | Autopore II 9220 (Micrometrics GmbH) |
| Sample preparation | pre-dry the sample for 15 h/100° C. cool to room temperature in a desiccator transfer the sample (0.05 + 0.1 g) to the penetrometer |
| Apparatus parameters | pressure range 4 kPa-200 MPa (53 measuring points) angle of contact 140° Hg surface tension 0.48 N/m |

Determining the dispersion by means of roughness measurement at the surface of the vulcanizate:

| | |
|---|---|
| Method | ASTM D 2663-89 |
| Apparatus | Surfanalyzer |
| Procedure | The surface roughness is determined by means of a diamond needle moving over a freshly cut surface of the vulcanizate and the value computed, by electronic processing, in the form of a roughness factor. The factor is made up from the number of signals (F) and its intensity (H) as follows: Surface roughness factor = F²H Interpretation of this factor indicates that dispersion of fillers in the polymer matrix is better the lower is this factor. |

Example 1

Preparation and characterization of precipitated silicas according to the invention in the CTAB surface area range 200–250 m²/g.

50 m³ of hot water and enough commercially available sulphuric acid (96% strength) to reach a pH of 5.5 are initially placed, with stirring, in a vat which is equipped with an Ekato disc agitator and an Ekato MIG stirrer (multistage impulse ribbon blender). While maintaining a constant precipitation temperature of 78° C. and a pH of 5.5, 7.6 m³/h of commercially available soda water glass solution (weight modulus 3.42, density 1.348) and 0.7 m³/h of sulphuric acid (96% strength) are simultaneously added over the course of 70 minutes. The Ekato SR disc agitator (diameter 320 mm, 6 lamella, 740 rpm) is in operation over the whole precipitation time. After 12 minutes, addition of the reactants soda water glass solution and sulphuric acid is interrupted for 80 minutes. The two stirrers are also kept in operation during this interval. The precipitated silica is separated on a filter press, washed and the filter cakes are subjected to spray-drying or spin-flash drying and optionally granulated in the dry state between two rollers.

The precipitated silica according to the invention has a CTAB surface area of 206 m²/g, a DBP index of 298 ml/100 g and a silanol group density ($V_2$) of 20.5 ml. The macropore size distribution is as follows:

| Macropore size interval [nm] | Hg consumed ml/g of silica |
|---|---|
| 10–20 | 0.29 |
| 20–30 | 0.24 |
| 30–40 | 0.19 |
| 40–50 | 0.15 |
| 50–60 | 0.11 |

Example 2

50 m³ of hot water and enough commercially available sulphuric acid (96% strength) to reach a pH of 5.5 are initially placed, with stirring, in a vat which is equipped with an Ekato disc agitator and an Ekato MIG stirrer. While maintaining a constant precipitation temperature of 78° C. and a pH of 5.5, 7.6 m³/h of commercially available soda water glass solution (weight modulus 3.42, density 1.348) and 0.7 m³/h of sulphuric acid (96% strength) are simultaneously added over the course of 56 minutes. The Ekato SR disc agitator (diameter 320 mm, 6 lamella, 740 rpm) is in operation over the whole precipitation time. After 12 minutes, addition of the reactants soda water glass solution and sulphuric acid is interrupted for 80 minutes. The two stirrers are also kept in operation during this interval. The precipitated silica is separated on a filter press, washed and the filter cakes are subjected to spray-drying or spin-flash drying and optionally granulated in the dry state between two rollers.

The precipitated silica according to the invention has a CTAB surface area of 240 m²/g, a DBP index of 314 ml/100 g and a silanol group density ($V_2$) of 21.0 ml. The macropore size distribution is as follows:

| Macropore size interval [nm] | Hg consumed ml/g of silica |
|---|---|
| 10–20 | 0.48 |
| 20–30 | 0.30 |
| 30–40 | 0.16 |
| 40–50 | 0.13 |
| 50–60 | 0.09 |

Example 3

Production and characterization of a precipitated silica according to the invention with a CTAB surface area in the range 250–300 m²/g 57 m³ of hot water and enough commercially available sulphuric acid (96% strength) to reach a pH of 5.5 are initially placed, with stirring, in a vat which is equipped with an Ekato disc agitator and an Ekato MIG stirrer. While maintaining a constant precipitation temperature of 55° C. and a pH of 5.5, 8.2 m³/h of commercially available soda water glass solution (weight modulus 3.42, density 1.348) and 0.75 m³/h of sulphuric acid (96% strength) are simultaneously added over the course of 56 minutes. The Ekato SR disc agitator (diameter 320 mm, 6 lamella, 740 rpm) is in operation over the whole precipitation time. After 13 minutes, addition of the reactants soda water glass solution and sulphuric acid is interrupted for 90 minutes. The two stirrers are also kept in operation during this interval. The precipitated silica is separated on a filter press, washed and the filter cakes are subjected to spray-drying or spin-flash drying and optionally granulated in the dry state between two rollers.

The precipitated silica according to the invention has a CTAB surface area of 283 m²/g, a DBP index of 349 ml/100 g and a silanol group density ($V_2$) of 24.0 ml. The macropore size distribution is as follows:

| Macropore size interval [nm] | Hg consumed ml/g of silica |
| --- | --- |
| 10–20 | 0.42 |
| 20–30 | 0.22 |
| 30–40 | 0.14 |
| 40–50 | 0.10 |
| 50–60 | 0.07 |

Example 4

Production and characterization of a precipitated silica according to the invention with a CTAB surface area in the range 300–400 m²/g 57 m³ of hot water and enough commercially available sulphuric acid (96% strength) to reach a pH of 5.5 are initially placed, with stirring, in a vat which is equipped with an Ekato disc agitator and an Ekato MIG stirrer. While maintaining a constant precipitation temperature of 50° C. and a pH of 5.5, 8.2 m³/h of commercially available soda water glass solution (weight modulus 3.42, density 1.348) and 0.75 m³/h of sulphuric acid (96% strength) are simultaneously added over the course of 56 minutes. The Ekato SR disc agitator (diameter 320 mm, 6 lamella, 740 rpm) is in operation over the whole precipitation time. After 13 minutes, addition of the reactants soda water glass solution and sulphuric acid is interrupted for 90 minutes. The two stirrers are also kept in operation during this interval. The precipitated silica is separated on a filter press, washed and the filter cakes are subjected to spray-drying or spin-flash drying and optionally granulated in the dry state between two rollers.

The precipitated silica according to the invention has a CTAB surface area of 360 m²/g, a DBP index of 350 ml/100 g and a silanol group density ($V_2$) of 29.0 ml. The macropore size distribution is as follows:

| Macropore size interval [nm] | Hg consumed ml/g of silica |
| --- | --- |
| 10–20 | 0.35 |
| 20–30 | 0.19 |
| 30–40 | 0.13 |
| 40–50 | 0.11 |
| 50–60 | 0.09 |

The physico-chemical characteristics of the precipitated silica granules obtained in accordance with examples 1 to 4 are as follows:

| Example | 1 | 2 | 3 | 4 |
| --- | --- | --- | --- | --- |
| Moisture content % | 4.8 | 5.5 | 5.0 | 5.2 |
| N₂ surface area (BET) m²/g | 275 | 290 | 413 | 522 |
| Compacted density g/l | 246 | 270 | 234 | 220 |
| Absorption of DBP g/100 g - by original material - | 194 | 198 | 226 | 236 |
| ALPINE screen tailings >63 μm | 89 | 93 | 83 | 85 |

In carrying out the invention to produce the new precipitated silicas, the total precipitation time can range from about 30 to 90 minutes, not counting the time of interruption which can range from 30 to 120 minutes. The above examples show a total precipitation time of 56 to 70 minutes. In all examples, the first precipitation step is halted when it is detected that the viscosity increase. After the interruption time of 30 to 120 minutes, the precipitation process is taken up again with the addition of the reactants.

Example 5

Precipitated silicas in a NR truck vehicle tread compound

| Formula | 1 (Standard) | 2 | 3 | 4 | 5 |
| --- | --- | --- | --- | --- | --- |
| RSS 1 | 100 | 100 | 100 | 100 | 100 |
| N 220 | 50 | — | — | — | — |
| Pptd. silica from ex. 1 | — | 38 | — | — | — |
| Pptd. silica from ex. 2 | — | — | 35 | — | — |
| Pptd. silica from ex. 3 | — | — | — | 32 | — |
| Pptd. silica from ex. 4 | — | — | — | — | 32 |
| ZnO RS | 4 | 4 | 4 | 4 | 4 |
| Stearic acid | 2 | 2 | 2 | 2 | 2 |
| 6PPD | 2 | 2 | 2 | 2 | 2 |
| TMQ | 1 | 1 | 1 | 1 | 1 |
| Protector G 35 | 1.5 | 1.5 | 1.5 | 1.5 | 1.5 |
| X 50-S | — | 19 | 19 | 19 | 19 |
| TBBS | 1.2 | — | — | — | — |
| DPG | — | 0.75 | 0.75 | 0.75 | 0.75 |
| CBS | — | 1.45 | 1.45 | 1.45 | 1.45 |
| Sulphur | 1.2 | 1.7 | 1.7 | 1.7 | 1.7 |

Mixing procedure

Mixer: GK 1.6N

Step 1

Friction: 1:1.1

Speed of rotation: 70

Extent of filling: 0.7

| Mixing time | Mixture 1 | Mixture 2–5 |
| --- | --- | --- |
| 0–1' | Polymer | Polymer |
| 1–2' | 1/2 N220, ZnO, stearic acid, protector G 35 | 1/2 silica, ZnO, stearic acid, protector G 35 |
| 2–3' | 1/2 N 220 6PPD + TMQ | 1/2 silica, 6PPD + TMQ |
| 3–4.5' | Mix and discharge | Mix and discharge Discharge temperature: 155° C. |

Step 2

Friction: 1:1.1

Speed of rotation: 70

Extent of filling: 0.68

| Mixing time | Mixture 1 | Mixture 2–5 |
| --- | --- | --- |
| 0–4' | Step 1 batch | Step 1 batch, X 50-S |
| 4' | Discharge | Discharge temperature: 160° C. |

Step 3

Friction: 1:1.1

Speed of rotation: 40

Extent of filling: 0.65

| Mixing time | Mixture 1 | Mixture 2–5 |
|---|---|---|
| 0–1.5' | Step 2 batch TBBS, sulphur | Step 2 batch CBS, DPG, sulphur |
| 1.5' | Discharge Discharge temperature: ~90° C. | |

| Mixture | 1 standard | 2 Pptd. silica from ex. 1 | 3 Pptd. silica from ex. 2 | 4 Pptd. silica from ex. 3 | 5 Pptd. silica from ex. 4 |
|---|---|---|---|---|---|
| Vulcanizing time [min] | 20 | 35 | 35 | 35 | 40 |
| F²H (dispersion) | 13897 | 10327 | 6688 | 12130 | 13472 |
| ML (1 + 4) | 71 | 71 | 68 | 71 | 68 |
| Tensile strength [MPa] | 25.0 | 23.6 | 25.9 | 23.4 | 25.9 |
| 300% modulus [MPa] | 11.7 | 12.5 | 12.0 | 11.2 | 10.9 |
| Shore A hardness | 66 | 69 | 69 | 68 | 64 |
| DIN abrasion [mm3] | 98 | 103 | 91 | 103 | 89 |
| Tear propagation resistance [N/mm] | 26 | 25 | 28 | 30 | 34 |
| MTS tan @ (60° C.) | 0.133 | 0.069 | 0.068 | 0.073 | 0.065 |

Use of the precipitated silicas according to the invention leads to a much lower tan ∂ (60° C.) value for approximately the same hardness and abrasion values, which means that the rolling resistance, and thus the gasoline consumption, can be clearly reduced as compared with a standard truck tread compound.

The dispersion, determined by a roughness measurement, was of the same order as in the carbon black standard sample, despite the large surface area of the precipitated silicas.

Example 6

Precipitated silicas in a NR/BR truck vehicle tread compound

| | Formulation | | | | |
|---|---|---|---|---|---|
| | 1 (Standard) | 2 | 3 | 4 | 5 |
| RSS 1 | 100 | 75 | 75 | 75 | 75 |
| Buna CB 11S | — | 25 | 25 | 25 | 25 |
| N 220 | 50 | — | — | — | — |
| Pptd. silica from ex. 1 | — | 38 | — | — | — |
| Pptd. silica from ex. 2 | — | — | 35 | — | — |
| Pptd. silica from ex. 3 | — | — | — | 32 | — |
| Pptd. silica from ex. 4 | — | — | — | — | 32 |
| ZnO RS | 4 | 4 | 4 | 4 | 4 |
| Stearic acid | 2 | 2 | 2 | 2 | 2 |
| 6PPD | 2 | 2 | 2 | 2 | 2 |
| TMQ | 1 | 1 | 1 | 1 | 1 |
| Protector G 35 | 1.5 | 1.5 | 1.5 | 1.5 | 1.5 |
| X 50-S | — | 19 | 19 | 19 | 19 |
| TBBS | 1.2 | — | — | — | — |
| DPG | — | 0.75 | 0.75 | 0.75 | 0.75 |
| CBS | — | 2 | 2 | 2 | 2 |
| Sulphur | 1.2 | 1.7 | 1.7 | 1.7 | 1.7 |

Mixing procedure: see example 5

Vulcanizate data: 150° C./$t_{95\%}$

| | Mixture | | | | |
|---|---|---|---|---|---|
| | 1 standard | 2 Pptd. silica from ex. 1 | 3 Pptd. silica from ex. 2 | 4 Pptd. silica from ex. 3 | 5 Pptd. silica from ex. 4 |
| Vulcanizing time [min] | 20 | 30 | 30 | 30 | 30 |
| F²H (dispersion) | 14721 | 12398 | 12321 | 14098 | 10876 |
| ML (1 + 4) | 72 | 79 | 84 | 84 | 87 |
| Tensile strength [MPa] | 25.7 | 22.3 | 22.6 | 22.9 | 20.7 |
| 300% modulus [MPa] | 11.7 | 13.6 | 12.5 | 12.2 | 11.5 |
| Elongation at break [%] | 540 | 430 | 450 | 470 | 457 |
| Shore A hardness | 67 | 71 | 70 | 70 | 69 |
| DIN abrasion [mm3] | 95 | 70 | 73 | 83 | 70 |
| MTS | | | | | |
| tan δ (60° C.) | 0.150 | 0.063 | 0.063 | 0.062 | 0.062 |

The mixtures with precipitated silicas according to the invention, with approximately identical values for hardness and modulus, have an excellent dispersion, good resistance to abrasion and a very low tan ∂ (60° C.) value (equivalent to rolling resistance).

Example 7

Precipitated silicas in a NR/S-SBR tread compound

| | Formulation | | | | |
|---|---|---|---|---|---|
| | 1 (Standard) | 2 | 3 | 4 | 5 |
| RSS 1 | 100 | 75 | 75 | 75 | 75 |
| Buna VSL 1954/S 25 | — | 25 | 25 | 25 | 25 |
| N 220 | 50 | — | — | — | — |
| Pptd. silica from ex. 1 | — | 38 | — | — | — |
| Pptd. silica from ex. 2 | — | — | 35 | — | — |
| Pptd. silica from ex. 3 | — | — | — | 32 | — |
| Pptd. silica from ex. 4 | — | — | — | — | 32 |
| ZnO RS | 4 | 4 | 4 | 4 | 4 |
| Stearic acid | 2 | 2 | 2 | 2 | 2 |
| 6PPD | 2 | 2 | 2 | 2 | 2 |
| TMQ | 1 | 1 | 1 | 1 | 1 |
| Protector G 35 | 1.5 | 1.5 | 1.5 | 1.5 | 1.5 |
| X 50-S | — | 19 | 19 | 19 | 19 |
| TBBS | 1.2 | — | — | — | — |
| DPG | — | 0.75 | 0.75 | 0.75 | 0.75 |
| CBS | — | 2 | 2 | 2 | 2 |
| Sulphur | 1.2 | 1.3 | 1.3 | 1.3 | 1.3 |

Mixing procedure: see example 5
Vulcanizate data: 150° C./$t_{95\%}$

| | Mixture | | | | |
|---|---|---|---|---|---|
| | 1 standard | 2 Pptd. silica from ex. 1 | 3 Pptd. silica from ex. 2 | 4 Pptd. silica from ex. 3 | 5 Pptd. silica from ex. 4 |
| Vulcanizing time [min] | 20 | 25 | 25 | 25 | 25 |
| F$^2$H (dispersion) | 12738 | 17520 | 20196 | 27299 | 17226 |
| ML (1 + 4) | 71 | 71 | 68 | 71 | 71 |
| Tensile strength [MPa] | 24.7 | 18.6 | 21.3 | 20.3 | 20.3 |
| 300% modulus [MPa] | 11.4 | 15.1 | 13.4 | 11.8 | 10.6 |
| Elongation at break [%] | 530 | 360 | 430 | 450 | 471 |
| Shore A hardness | 66 | 71 | 69 | 67 | 66 |
| DIN abrasion [mm3] MTS | 110 | 106 | 107 | 110 | 115 |
| tan δ (0° C.) | 0.260 | 0.270 | 0.264 | 0.256 | 0.265 (0.165) |
| tan δ (60° C.) | 0.133 | 0.073 | 0.082 | 0.082 | 0.080 |

Use of the precipitated silicas according to the invention, with excellent dispersion and comparable abrasion to that of a standard mixture, can both improve tan $\partial$ (0° C.) (equivalent to skid resistance in the wet) and also reduce the rolling resistance [tan $\partial$ (60° C.)].

Further variations and modifications will be apparent to those skilled in the art from the foregoing and are intended to be encompassed by the claims appended hereto. German priority applications 195 20 126.4 and 196 17 039.7 are relied on and incorporated herein by reference.

We claim:

1. A process for producing a precipitated silica having a CTAB surface area, in accordance with ASTM D 3765-92, of 200 to 400 m$^2$/g, a DBP index, in accordance with ASTM D 2414, between 230 and 380 ml/100 g as powder and 180–250 g/100 g as granulate, a silanol group density, V$_2$-NaOH consumption, of 20 to 30 ml and the following macropore size distribution which is typical of the surface area range involved, determined by means of Hg porosimetry (DIN 66 133) for specific pore size intervals (incremental mode of application):

| Pore size interval in nm | CTAB surface area range: 200–250 m$^2$/g | CTAB surface area range: 250–300 m$^2$/g | CTAB surface area range: 300–400 m$^2$/g |
|---|---|---|---|
| | Hg consumption in ml/g of silica | | |
| 10–20 | 0.27–0.49 | 0.35–0.50 | 0.32–0.42 |
| 20–30 | 0.22–0.32 | 0.15–0.30 | 0.17–0.22 |
| 30–40 | 0.15–0.21 | 0.12–0.17 | 0.12–0.15 |
| 40–50 | 0.11–0.16 | 0.09–0.12 | 0.08–0.11 |
| 50–60 | 0.08–0.12 | 0.06–0.10 | 0.06–0.09 | and produced by reacting sulphuric acid with an alkali metal silicate solution, which process comprises:

acidifying water at a temperature from 30° to 90° C. to a pH of 5 to 5.9 by adding small amounts of sulphuric acid;

introducing simultaneously said alkali metal silicate solution and sulphuric acid in to said acidified water to precipitate silica, the pH of the solution being kept constant at 5 to 5.9 and the reaction solution being agitated during the entire process;

suspending the introduction of said alkali metal silicate and sulphuric acid when it is detected that the viscosity of the reaction solution increases to halt the precipitation of silica;

after an interval of 30 to 120 minutes, resuming the introduction of alkali metal silicate and sulphuric acid into the reaction solution until the concentration of silica reaches from 40 to 60 g/liter, thereby producing a silica suspension.

2. The process according to claim 1 wherein said water is at 50° to 80° C.

3. The process according to claim 1 further comprising filtering said silica suspension to form a filter cake.

4. The process according to claim 3 further comprising washing said filter cake.

5. The process according to claim 4 further comprising drying said filter cake after washing.

6. The process according to claim 5 wherein said filter cake is milled or granulated.

7. A precipitated silica having a CTAB surface area, in accordance with ASTM D 3765-92, of 200 to 400 m$^2$/g, a DBP index, in accordance with ASTM D 2414, between 230 and 380 ml/100 g as powder and 180–250 g/100 g as granulate, a silanol group density, V$_2$-NaOH consumption, of 20 to 30 ml and the following macropore size distribution which is typical of the surface area range involved, determined by means of Hg porosimetry (DIN 66 133) for specific pore size intervals (incremental mode of application):

| Pore size interval in nm | CTAB surface area range: 200–250 m²/g | CTAB surface area range: 250–300 m²/g | CTAB surface area range: 300–400 m²/g |
|---|---|---|---|
| | Hg consumption in ml/g of silica | | |
| 10–20 | 0.27–0.49 | 0.35–0.50 | 0.32–0.42 |
| 20–30 | 0.22–0.32 | 0.15–0.30 | 0.17–0.22 |
| 30–40 | 0.15–0.21 | 0.12–0.17 | 0.12–0.15 |
| 40–50 | 0.11–0.16 | 0.09–0.12 | 0.08–0.11 |
| 50–60 | 0.08–0.12 | 0.06–0.10 | 0.06–0.09 | and produced by reacting sulphuric acid with an alkali metal silicate solution, which process comprises:

acidifying water at a temperature from 30° to 90° C. to a pH of 5 to 5.9 by adding small amounts of sulphuric acid;

introducing simultaneously said alkali metal silicate solution and sulphuric acid in to said acidified water to precipitate silica, the pH of the solution being kept constant at 5 to 5.9 and the reaction solution being agitated during the entire process;

suspending the introduction of said alkali metal silicate and sulphuric acid when it is detected that the viscosity of the reaction solution increases to halt the precipitation of silica;

after an interval of 30 to 120 minutes, resuming the introduction of alkali metal silicate and sulphuric acid into the reaction solution until the concentration of silica reaches from 40 to 60 g/liter, thereby forming a silica suspension.

\* \* \* \* \*